July 11, 1967    KIYOSHI INOUE    3,330,746
ELECTROLYTIC SYNTHESIS OF METALLIC HALIDES
Filed April 2, 1964
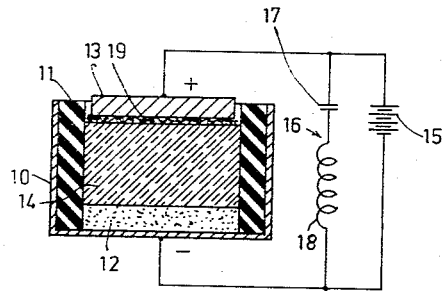
Fig. 1
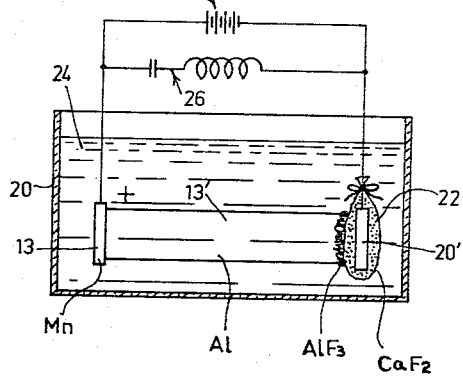
Fig. 2
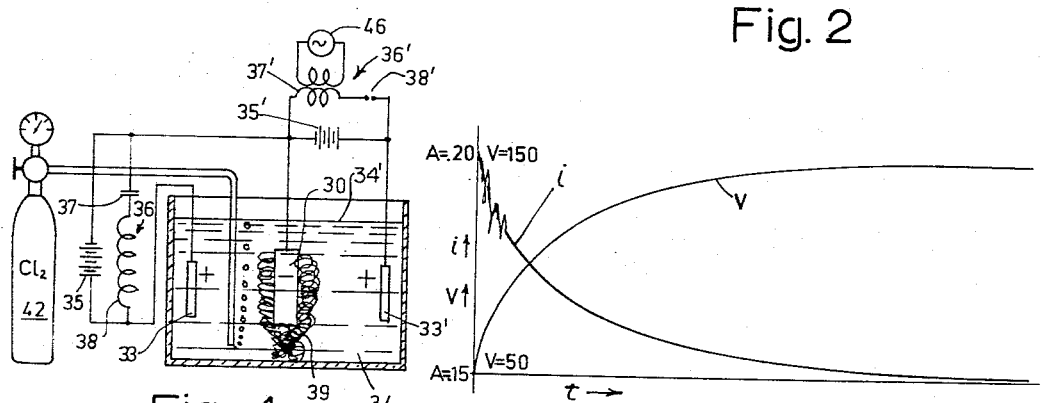
Fig. 4
Fig. 3
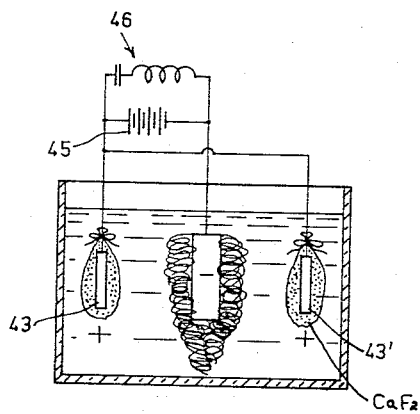
Fig. 6
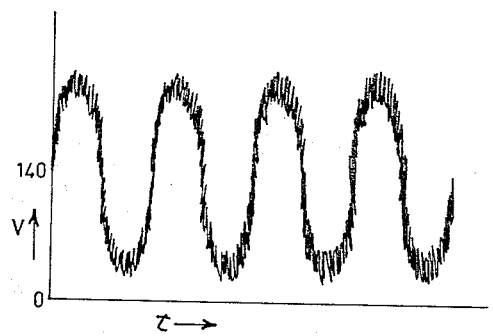
Fig. 5
KIYOSHI INOUE
*INVENTOR.*
BY Karl F. Ross
AGENT United States Patent Office 3,330,746
Patented July 11, 1967

3,330,746
ELECTROLYTIC SYNTHESIS OF METALLIC HALIDES
Kiyoshi Inoue, 100 Sakato, Kawasaki, Kanagawa, Tokyo, Japan
Filed Apr. 2, 1964, Ser. No. 356,715
Claims priority, application Japan, Feb. 7, 1962, 37/4,656
10 Claims. (Cl. 204—94)

ABSTRACT OF THE DISCLOSURE

A method of synthesizing chemical compounds by disposing a solid material having an affinity for an ionizable element between a pair of electrodes having further a conductive medium therebetween capable of ionizing the substance whereby the element drifts along a path between the electrodes and diffuses into the material.

My present invention relates to a method of synthesizing chemical compounds as well as to the products of this method. This application is a continuation-in-part of my application Ser. No. 254,360, filed Jan. 28, 1963 (now abandoned).

While many types of electrolytic synthesis are known, almost all are characterized by a high impurity level and an inability to recover the product in a pure state.

It is an object of the present invention to provide an improved method of electrically producing chemical compounds which can be readily recovered and can, if desired, be substantially free from contaminants.

It is another object of this invention to provide a method of producing chemical compounds without the aid of such liquid media which tends to dissociate, thereby causing a loss of power and a decrease in the efficiency of the operation.

Yet another object of the invention is to provide a method of producing noncontaminated metal salts.

Still another object is to produce polymeric compounds without the use of high temperature and pressures.

A further object is to provide a polymer of highly desirable characteristics and yet capable of simple production.

One of the great disadvantages of electrolysis systems for the production of free metals and metal salts is that they most generally employ an electrolyte containing anions and cations of the starting material and/or of a compound added to improve the conductivity of the surrounding medium. Frequently overvoltage effects must be contended with since when, say, an aqueous solution is employed, hydrogen or oxygen may be evolved prior to the desired interaction. It has been discovered that it is possible to avoid these disadvantages and others previously mentioned by providing a method of synthesizing chemical compounds which comprises the steps of disposing a starting substance, which contains an ionizable element whose combination with another material is desired, between a pair of electrodes and establishing an electric field across the electrodes. This electric field has a unidirectional component and is capable, in addition to causing an ionization of the element, of effecting a drift thereof along a path between the electrodes. Along this path is disposed a material having an affinity for the element in its ionized state and which thus chemically combines therewith. The material positioned in the path of ion drift can be a solid across which the electric field is applied and through which the ionized element diffuses with or without chemical combination with the material. It is a principal feature of the invention to provide a conductive medium which forms the drift path but in which the starting substance is at most only partly soluble. It is thus possible to avoid the presence of, say, cations of the starting material when the anions thereof are to be combined with another element. Only the anion traverses the conductive medium which, advantageously, can be a metal, a supercooled liquid or another viscous medium wherein the starting substance is only slightly soluble. By "slightly soluble" is meant a solubility appreciably less than that that of, say, potassium chloride and as high as about 15 g./100 ml. of water. The high viscosity of the medium also prevents thermal diffusion of the undesirable cation through the medium in opposition to the unidirectional field component. It should be noted, however, that water or other liquids having low viscosities may be employed but only with detriment to the noncontaminated product when the starting substance is appreciably soluble in the medium.

It has ben found that low density metals and other noncrystalline materials (e.g. conductive pastes, gels and amorphous substances) are particularly suitable as conductive media for the present purpose. The starting substance is preferably a salt of a lower metal (i.e. the salt of a cation from Groups 1 and 2 of the periodic table) while the receptive material can be constituted by a metal from the higher groups of the periodic table; higher-metal salts can be used if it is desired to produce the free metal. It is thus possible to employ substances such as sodium fluoride, calcium fluoride, magnesium fluoride, potassium fluotitanate, sodium fluosilicate and sodium fluoaluminate, while the receptive metals, which can constitute one of the electrodes, may be composed of manganese, molybdenum, tin, silicon or the like.

While generally all halides can be employed with the instant method, it is preferred to use only the low atomic weight halogens (e.g. fluorine) since ions of these elements have a smaller ionic radius and are more capable of rapid diffusion through a viscous medium.

It is also contemplated, in accordance with the invention to expedite the production of polymeric materials using the aforedescribed technique and indeed it has been discovered that electrolysis of this nature can produce polymers having the high qualities normally associated with polyvinyl compounds by this method. In addition to the unidirectional field component it has been found important to apply a high-frequency alternating current to the electrodes. While the mechanism for this reaction is not wholly understood at the present time, it is believed that the applied high frequency is in resonance with one or more vibrational modes of the long-chain carbon molecules disposed between the electrodes. The molecules may be presumed to be raised by the high frequency energizing current to an activated state wherein bond rupture occurs presumably with ionization of some of the fragments. It is also possible that the fragments possess, in addition to a net electrical charge, at least one available unpaired electron and thus can be considered to combine properties of free radicals and ions. In any event the charged fragments apparently drift under the influence of the unidirectional field component to one of the electrodes, in this case the cathode, and chemically combine additively to produce a polymer characterized by both linear combination and cross-linkage. This polymer has not been precisely identified although it appears to be some form of substantially saturated molecule, a surprising result in view of the use of hydrocarbons and carbohydrates as starting materials. The energizing frequency can be selected to be a harmonic of the characteristic frequency of a vibrational mode or may be the algebraic sum of two or more characteristic frequencies. When the solution of sucrose is employed, an input frequency of about 90 kc./sec. yields best results with a single frequency while a simultaneous activation of two different frequencies gives a still greater yield. The two different frequencies can range respectively from 30 kc./sec. to 1 mc./sec. and from 125 kc./sec. to 3 mc./sec. The addition reaction at the cathode is expedited when the latter is composed of a catalytically active metal such as nickel or copper. The high-frequency energization voltage results in the development of a spark discharge within the bath, the impulse action of which may in some way produce the desired fragments.

The above and other objects, features and advantages of the present invention will become more readily apparent from the following description, reference being made to the appended examples and the accompanying drawing in which:

FIG. 1 is a diagramatic cross-sectional view of a cell for the dry synthesis of metal salts;

FIG. 2 is a similar view of an arrangement for the production of water-soluble salts with the aid of an aqueous medium;

FIG. 3 is a graph of the pressure and voltage relationships found in connection with the arrangement of FIG. 2;

FIG. 4 is a diagrammatic cross-sectional view illustrating the formation of polymeric materials;

FIG. 5 is a graph of the electrolyzing voltage developed across the electrode thereof; and FIG. 6 is a view similar to FIG. 4 according to a modification of the invention.

In FIG. 1 I show a cell 10 of conductive material (e.g. stainless steel) which is lined along its lateral walls with an insulating layer 11 and contains a mass of powder 12 one of whose constituents is to be added to the metal of a counterelectrode 13 bearing against a mass 14 of temperature-conditioned supercooled liquid. The latter may be a noncrystalline material (e.g. an amorphous paste) containing a high percentage of metal or metal salts or thermally treated so that it is at least limitedly conductive. Electrode 13 constitutes the anode while the cell 10 forms the cathode, both of which are bridged across a direct-current source 15. In addition, a spark-generating network 16, consisting of a capacitor 17 and an inductor 18, may be tied across a direct-current source 15 if an additional energiation via arc discharge is required.

*Example I*

The powered mass 12 is constituted by a halide salt of a metal from the first or second groups of the periodic table and preferably a fluoride or a complex anion containing a fluoride. In the present case sodium fluoride was employed although similar results were obtained when calcium fluoride, potassium fluotitanate, sodium fluosilicate, sodium fluoaluminate and magnesium fluoride were employed. The powered mass had a contact area of approximately 50 cm.$^2$ while an initial current density of about 0.2 amp./cm.$^2$ was provided at an average direct-current voltage of 100 volts. Initially, the voltage was about 50 volts with an increase to 150 volts during the course of operation. The spark-generating network 16 provided a resonance frequency of 380 kc./sec. with a current of 0.3 A. and a voltage amplitude of 20 volts. When the apparatus had been in operation for about one hour, 10 g. of the fluoride salt of the metal, in this case aluminum, constituting electrode 13 was recovered from the interfacial zone 19 between the electrode and the conductive body 14. The conductive medium was a paste containing sodium fluoride and silicon oxide in amounts of about 50% each by weight while the anode was composed of aluminum, the salt 19 being substantially pure aluminum fluoride with traces of the free metal apparently resulting from an initial spark discharge between this electrode and the medium 14 as well as between the cell 10 and this body to initially ionize the starting salt 12. The presence of the free metal might also have been due to mechanical erosion of the anode. Fluoride ion apparently drifted under the influence of the unidirectional electric fluid through the conductive body 14 and combined with the aluminum of the anode. It was found that chemically equivalent amounts of the aluminum fluoride, tin fluoride and silicon fluoride could be obtained using similar operating conditions and the apparatus illustrated. The product 19 was essentially free from any contaminants other than the free metal and not even traces of the cation of the starting material could be detected.

*Example II*

Using the apparatus described with reference to FIG. 1, a zinc electrode suitable for use with alkaline electrochemical systems and evidencing no tendency to discharge upon standing was prepared. Instead of the sodium fluoride of Example I, a relative thin layer (i.e. 10 g.) of zinc fluoride was disposed at 12. The contact surface was approximately 5 cm.$^2$ and again an average voltage of 100 volts was employed against a manganese anode. Using a means current density of approximately 0.18 amp./cm.$^2$ for a period of about 5½ hours substantially complete conversion of the zinc fluoride to metallic zinc was obtained. The operating characteristic of the spark-generating network 16 was similar to that of the discharge network employed in Example I. The metallic zinc was at least partly fused to the wall of the cell 10 which evidenced a weight gain of about 0.6 g., indicating that substantially no fluoride remained. The resulting electrochemical electrode had an exceptionally high surface area and was totally uncontaminated by materials normally present in aqueous solutions and, additionally, was perfectly dry and coherent so that no self-discharge could take place. The electrode was found to have a shelf-life many times greater than that of conventional electroformed zinc battery plates. Interestingly enough, the manganese anode 13 yielded substantially pure manganese fluoride.

In FIGS. 2 and 3 there is shown an arrangement for synthesizing higher-metal salts with the aid of an aqueous medium. The apparatus comprises a container 20 for a water bath 24 in which the anode 13 and the cathode 20' are immersed. These electrodes are again provided with a battery 25 and a spark generator 26 as previously described. In addition to the anode 13, a conductive body 13' of a material to be reacted with the displaced anion is provided in contact with anode 13. The cathode 20' is surrounded by an ion-permeable bag filled with the cathode starting material 22. The semi-permeable bag may be so designed that almost no water is capable of penetration or may be sufficiently penetrable by water to permit the salt therein to dissociate slightly. It should, however, be noted that the salt is preferably one which is relatively insoluble or, at most, only slightly soluble in the liquid medium.

*Example III*

The cathode material 22 is powdered calcium fluoride which is in intimate contact with the stainless steel cathode 20'. The manganese anode bears against the conductive body 13' through which, under the influence of the unidirectional electric field diffusion of fluoride ion takes place. The fluoride ion reacts with the aluminum after a diffusion penetration into the body 13' so that a zone on the order of 10 microns in thickness of aluminum trifluoride is produced. The aluminum trifluoride can dissolve in the ambient liquid and is removed therefrom either by evaporation or by precipitation as, say, cryolite upon addition of sodium fluoride. As can be seen from FIG. 3, the current $i$ passing between the electrodes is initially spiked, an evidence of spark discharge, and produces an initial ionization which renders the ambient solution conductive. As the fluorine penetrates further into the aluminum, the current falls off from an initial value of 0.2 amp./cm.$^2$ to its final value of 0.15 amp./cm.$^2$ while the voltage rises from 50 volts to 150 volts during the course of the one hour operation. A total quantity of about 10 g. of the fluoride is obtained when a contact surface of about 50 cm.$^2$ is used. The aluminum trifluoride is substantially uncontaminated by other materials since the aluminum bar 13′ is of the currently available substantially contamination-free variety.

*Example IV*

In the arrangement shown in FIG. 4 a polymeric mass 39 is produced by electrolyzing a carbohydrate solution 34 between a pair of anodes 33, 33′ and a common cathode 30. The direct-current component of the electric field is obtained from a pair of batteries 35, 35′ bridged across the respective anodes 33, 33′ and the cathode 30. A spark-producing network 36, consisting of an inductor 38 and capacitor 37, is connected in parallel with battery 35 while the inductance 37′ of the comparable network 36′ associated with battery 35′ works into a spark gap 38′. A high-frequency alternating current source 46 is inductively coupled with network 36′. An antioxidation layer 34 of an oil is disposed above the solution 34 to limit oxidation of the electrolyte solution and the materials immersed therein.

Using the apparatus illustrated in FIG. 4, a precipitate 39 consisting of a translucent polymer having high tensile strength and heat resistance with a relatively small optical absorption was obtained when the cathode 30 was composed of copper and had a diameter of about 6 mm. The electrolyte is a 50% solution of a potassium acetate and is saturated with a 30% solution of a carbohydrate (in this case maltose) although other sugars and some hydrocarbons were found to yield similar results but with reduced yields, and contains 1% by weight urea and is covered by a 10% by weight layer of machine oil. The anodes are composed of stainless steel and a frequency of 30 kc./sec. to 3 mc./sec. is developed between the anode 33 and the cathode 30. The potential of the D.C. component was 140 volts. The amplitude of the A.C. component was approximately 20 volts with a peak current of 3 amp. A temperature of about 40° C. is developed in the tank although the temperature in the vicinity of the cathode reaches about 100° C. As long as long-chain molecules are present, a polymeric precipitate having an indeterminate molecular weight ranging upwardly about 4000 is produced. When only the A.C. frequency is employed, however, the efficiency of the apparatus falls sharply and a reduced quantity of polymer is obtained relative to the energy used. It has been found to be possible to substitute highly negative ions for other functional groups and/or hydrogen atoms on the resulting polymer by introducing such ions into the solution and causing them to migrate toward the cathode. The polymer was chlorinated by bubbling chlorine from a tank 42 through the bath at the rate of about 30 cc./min. The polymer was found to be almost totally chlorinated after this operation and bore a remarkable resemblance to polyvinyl chloride. When nickel was substituted for the copper electrode, similar results were obtained although substitution of an inert electrode such as a stainless steel resulted in a reduction in the yield, thereby indicating that copper and nickel are catalytically active in effecting the chemical combination. From FIG. 5 it may be seen that a spark discharge superimposes itself on the basic alternating-current energizing field and has a frequency in excess of this basic A.C. While the role of the spark discharge is not fully understood, it should be noted that no polymer is formed in the absence of the spark. Apparently, the impulsive nature of the discharge facilitates the fragmentation of the sugar molecule and permits the fragments to be electrically drawn toward the cathode for recombination in the larger molecular units.

The apparatus of FIG. 6 is essentially similar to that of FIG. 5 with the exception that the anodes 43, 43′ are surrounded by permeable bags containing calcium fluoride.

*Example V*

Using the parameters and materials of Example IV but with calcium fluoride disposed at the anodes 43, 43′ of the apparatus of FIG. 6 and the chlorine-gas feed means dispensed with, a high molecular weight polymer containing bonded fluorine was produced. The product resembled polytetrafluoroethylene although it did not have complete substitution of fluorine from hydrogen. Additional characterization of the fluocarbon was impossible as a consequence of its complexity.

*Example VI*

A fluocarbon, having a molecular weight of approximately 36,000, generally similar to that obtained by Example V was produced when, in an apparatus of the type illustrated in FIG. 6, the liquid electrolyte was replaced by an intimate mixture of calcium fluoride and dry sugar. In this case the polymer was washed free from adherent sugar in a subsequent step. In the apparatus of FIG. 6 a single spark generator 46 is employed in conjunction with the battery 45 and a frequency of about 90 kc./sec. was superimposed on the unidirectional current. The fluorine content of the polymer was found to be 0.9% by weight (iodine value =56).

In Examples IV–VI a partial diffusion of charged molecular fragments into the solid polymeric material accumulated at the cathode can be noticed. This is particularly the case when fluorides are introduced into the polymer.

The invention described and illustrated is believed to admit of many modifications and variations readily apparent to persons skilled in the art and considered to lie within the spirit and scope of the invention as claimed.

I claim:
1. A method of synthesizing chemical compounds comprising the steps of disposing a substance containing an ionizable element between a pair of electrodes; establishing an electric field across said electrodes sufficient to ionize said element and having a unidirectional component adapted to cause a drift of said element along a path between said electrodes; positioning along said path a solid material having an affinity for said element in its ionized state, said material chemically combining with said element, said electric field being applied across said solid with the ionized element at least partly diffusing into the solid under the influence of said unidirectional component; and disposing a conductive medium having a low ability to dissociate said substance and to release said element in an ionic state in the absence of said electric field between said electrodes to form said path.

2. The method defined in claim 1 wherein said substance is substantially insoluble in said medium at operating temperature.

3. The method defined in claim 2 wherein said medium has a high viscosity.

4. The method defined in claim 3 wherein said medium is a gel.

5. The method defined in claim 3 wherein said medium is a metal in the solid state.

6. A method of synthesizing chemical compounds comprising the steps of disposing a substance containing an ionizable element between a pair of electrodes; establishing an electric field across said electrodes sufficient to ionize said element and having a unidirectional component adapted to cause a drift of said element along a path between said electrodes; and positioning along said path a solid material having an affinity for said element in its ionized state, said material chemically combining with said element, said electric field being applied across said solid with the ionized element at least partly diffusing into the solid under the influence of said unidirectional component, said electric field having a high-frequency component capable of activating said element and expediting dissociation of said substance.

7. The method as defined in claim 6 wherein a spark discharge is developed between said electrodes to at least initially ionize said element and partly dissociate said substance.

8. The method defined in claim 7 wherein said material is also at least partly dissociated by said discharge and is drawn toward said element under the influence of said unidirectional component for addition to said element.

9. A method of producing higher metal halides comprising the steps of disposing a lower metal halide between a pair of electrodes in proximity to one of said electrodes; interposing between said lower metal halide and the other of said electrodes a conductive medium in which said lower metal halide is at most slightly soluble; establishing a substantially unidirectional electric field between said electrodes with said one of said electrodes cathodic and said other of said electrodes anodic, thereby effecting a drift of halide ions through the medium in the direction of said other electrode; and disposing at said other electrode a higher metal having an affinity for said halide ions, thereby anodically combining said halide ions with said higher metal.

10. The method defined in claim 9 wherein said lower metal halide is selected from the group which consists of sodium fluoride, potassium, fluotitanate, sodium fluosilicate, sodium fluoaluminate, calcium fluoride and magnesium fluoride, said higher metal being selected from the group which consists of aluminum, manganese, molybdenum, tin and silicon, said medium being selected from the group which consists of metals, super-cooled liquids, dielectrics and water.

References Cited

UNITED STATES PATENTS

| | | | |
|---|---|---|---|
| 1,006,389 | 10/1911 | Luckow | 204—88 |
| 1,401,743 | 12/1921 | Sperry | 204—88 |
| 2,035,315 | 3/1936 | Harner et al. | 136—26 |
| 2,257,177 | 9/1941 | Luster | 204—156 |
| 2,632,729 | 3/1953 | Woodman | 204—72 |
| 2,726,204 | 12/1955 | Park et al. | 204—72 |
| 3,084,207 | 4/1963 | Huges et al. | 136—27 |

FOREIGN PATENTS 212   2/1892   Great Britain.

JOHN H. MACK, *Primary Examiner.*

H. M. FLOURNOY, *Assistant Examiner.*